ELECTRICALLY OPERATED TYPE WHEEL SETTING MEANS

Original Filed Dec. 20, 1961 3 Sheets-Sheet 1

INVENTOR:
BEREND B. SCHIERBEEK
BY
Marzall, Johnston, Cook & Root
ATT'YS

ELECTRICALLY OPERATED TYPE WHEEL SETTING MEANS
Original Filed Dec. 20, 1961 3 Sheets-Sheet 2
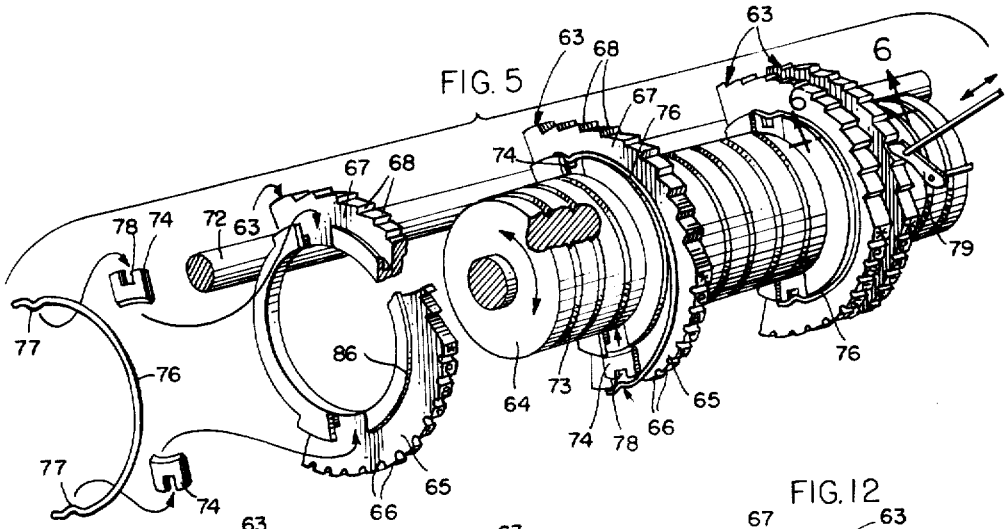
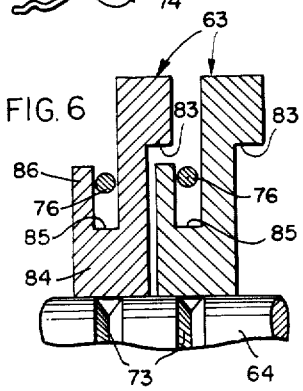
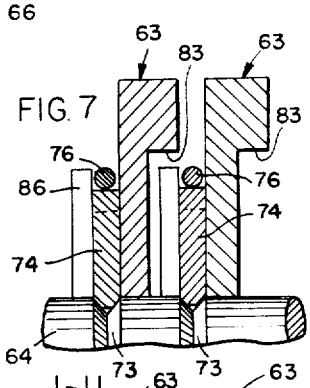
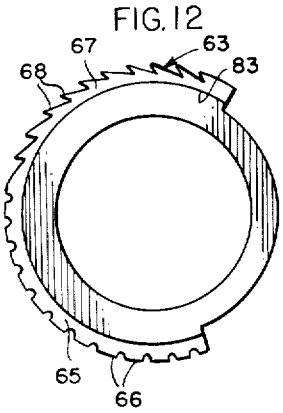
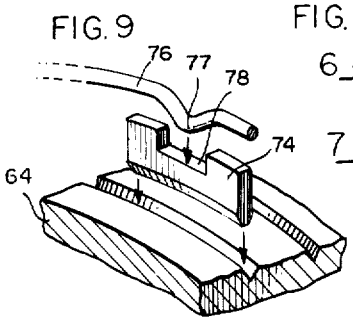
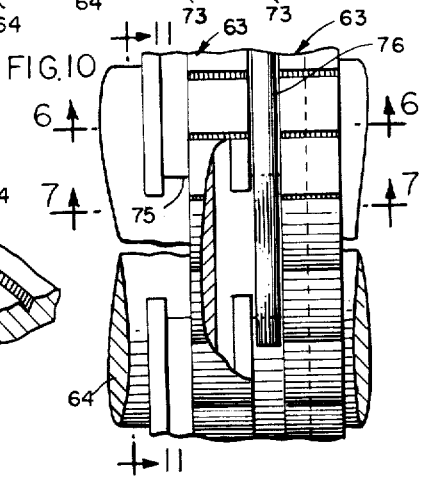
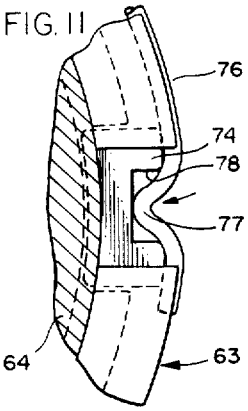
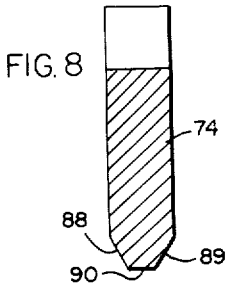
INVENTOR:
BEREND B. SCHIERBEEK
BY
Marzall, Johnston, Cook & Root
ATT'YS

ELECTRICALLY OPERATED TYPE WHEEL SETTING MEANS

Original Filed Dec. 20, 1961 3 Sheets-Sheet 3

INVENTOR:
BEREND B. SCHIERBEEK
BY
Marzall, Johnston, Cook & Root
ATT'YS

United States Patent Office

Re. 26,057
Reissued July 5, 1966

26,057
ELECTRICALLY OPERATED TYPE WHEEL SETTING MEANS

Berend B. Schierbeek, Leidschendam, Netherlands, assignor to Maatschappij van Berkel's Patent N.V., Rotterdam, Netherlands, a limited-liability company of the Netherlands Original No. 3,179,044, dated Apr. 20, 1965, Ser. No. 160,838, Dec. 20, 1961. Application for reissue Nov. 26, 1965, Ser. No. 515,802
8 Claims. (Cl. 101—93)

Matter enclosed in heavy brackets [ ] appears in the original patent but forms no part of this reissue specification; matter printed in italics indicates the additions made by reissue.

This invention relates in general to a printing device, and more particularly to a printing device that responds to electrical control and is capable of printing numerical values, and more particularly to a printing device for printing numerical measured values wherein the device may be set, caused to print and reset for a subsequent printing operation in a short period of time.

*Moreover, the device of the present invention may be employed as an indicator device, wherein indicator wheels are substituted for printing wheels and alignment of symbols of several wheels in a row will indicate a value.*

The printing device of the present invention particularly suitable for printing of scale weights of goods and/or measured values of the goods with or without unit prices and together with other information on a card or a paper tape. The device may be set for printing either manually or automatically and where automatically by electronic computers, digital measuring instruments, mechanical accounting machines or any other suitable mechanism.

Accordingly, it is an object of this invention to proivde a new and improved printing device capable of printing measured, computed or otherwise set values in a short period of time.

Another object of this invention resides in the provision of a printing device that is economical to build and simple in construction thereby reducing maintenance problems.

A still further object of this invention is to provide a printing device that may be quickly set in response to electromechanical apparatus for a printing operation.

Other objects, features and advantages of the invention will be apparent from the following detailed disclosure, taken in conjunction with the accompanying sheets of drawings, wherein like reference numerals refer to like parts, in which:

FIG. 5 is an exploded view of a modification of the invention as to the structure of the printing wheels;

FIG. 6 is an enlarged detail sectional view taken substantially along line 6—6 of FIGS. 5 and 10;

FIG. 7 is an enlarged transverse sectional view taken substantially along line 7—7 of FIG. 10;

FIG. 8 is an enlarged sectional view taken through one of the friction shoes used for frictionally coupling a printing wheel to the main power shaft;

FIG. 9 is a somewhat exploded view, illustrating the relationship of a friction shoe with respect to a groove on the shaft and how the spring applies pressure against the shoe;

FIG. 10 is an enlarged, broken and fragmentary view of a portion of a pair of printing wheels and illustrating where the shoes are received by the wheels;

FIG. 11 is an enlarged fragmentary and partially sectional view of a printing wheel associated with the main shaft and showing how a shoe is held in place by a spring in engagement with the shaft;

FIG. 12 is a side elevational view of a printing wheel of this embodiment showing the notched side thereof;

Figure 1:
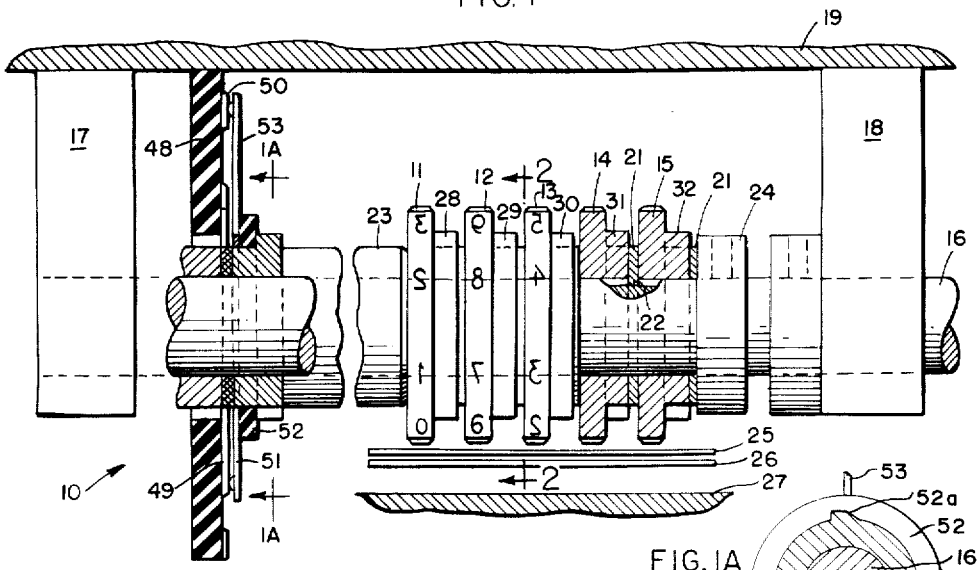
FIG. 1 is an elevational view, with some parts in section and other parts broken away for purposes of clarity of a printing device according to the invention.
Figure 2:
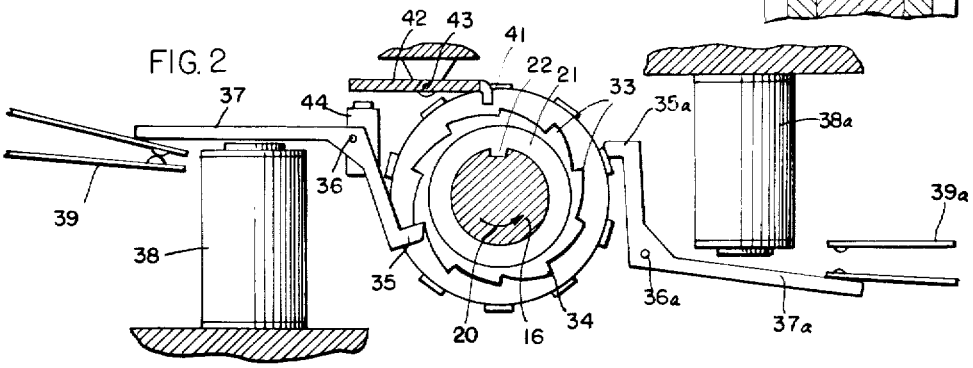
FIG. 2 is a transverse sectional view taken substantially along line 2—2 of FIG. 1.

Referring now to the drawings, and particularly to FIGS. 1 and 2, a printing device, according to the invention, generally designated by the numeral 10, includes a plurality of printing wheels 11, 12, 13, 14 and 15 mounted for free rotation of an elongated shaft 16. The shaft 16 is rotatably carried by bearing members 17 and 18 mounted on a frame 19 and is continuously driven in the direction indicated by the arrow 20, FIG. 2, by any suitable means.

A spring or wave washer 21 is positioned between the adjacent printing wheels and on the outside ends of the printing wheels 11 and 15. Each washer includes a lock detent 22 which engages in a longitudinal slot formed in the shaft 16 so that the washers co-rotate therewith. The washers are compressed to exert friction pressure against the printing wheels which are urged against a fixed bushing 23 by means of the adjustable collar 24. Thus, a friction clutching relationship exists between the shaft 16 and the printing wheels so that the printing wheels turn with the shaft unless they are restrained by some means.

As may be seen particularly in FIG. 1, each printing wheel is provided with a plurality of symbols such as numerals. An inked ribbon 25 is arranged below the printing wheels and over a printing tape or card 26. When a printing action is desired, a hammer 27 forces the tape 26 against the inking ribbon and against the symbols on the printing wheels so that the upper side of the tape 26 is effectively printed.

The printing wheels 11, 12, 13, 14, and 15 have integrally connected thereto ratchet portions 28, 29, 30, 31 and 32, respectively. Each ratchet portion includes a plurality of teeth 33 and a single enlarged tooth 34 which coact with electrically operable pawls 35 for stopping the wheels. Each pawl 35 is pivotal on a pin 36 and has integrally connected thereto a pawl actuating arm or plate 37 that is aligned with and responds to the energization and deenergization of an electromagnet 38. When the electromagnet or coil 38 is energized, the pawl actuating arm 37 will be drawn thereagainst and thereby swing the pawl 35 into the path of the ratchet portion to engage a tooth and stop movement of the wheel. Each printing wheel coacts with an electromagnet operated pawl assembly, and where the assembly might take up more space than the width of a printing wheel, the pawls and electromagnets may be staggered such as shown in FIG. 2 wherein the pawl 35a pivotal on a pin 36a and having a pawl arm 37a coacting with an electromagnet 38a would serve to coact with the ratchet portion 28 of the printing wheel 11. It should also be appreciated that a solenoid may be employed in place of an electromagnet, wherein the plungers thereof would be suitably connected to the pawl arms. While five printing wheels are shown on the shaft 16, it should be appreciated that a greater or lesser number may be employed depending on the particular needs of an installation.

In order to synchronize the positions of all printing wheels prior to the setting thereof at a numerical value, a stop or synchronizing pawl 41 carried on a pawl arm 42 pivotal on a pin 43 is provided for selective engagement only with the enlarged ratchet tooth on each of the ratchet portions, such as the tooth 34 on the ratchet portion 29, FIG. 2. The pawl 41 stops the printing wheel at a predetermined synchronized location. The tooth 34 extends radially outwardly from the teeth 33 which are engaged by the pawl 35. And the stop pawl 41 is arranged so that it will not engage the teeth 33. A similar pawl is provided for each of the ratchet portions to act as a stop in engaging the enlarged tooth. A single electromagnet 44 serves to deactivate the pawl 41 or raise it to a position out of the path of the enlarged teeth or the tooth 34 so that the printing wheels can then rotate with the shaft. With all of the printing wheels in the same position as defined by the pawl 41, they will all register the same numerals and when they are released, the various electromagnet operated pawl and ratchet assemblies may be subsequently sequentially operated to set a predetermined value in the printing device.

Figure 4:
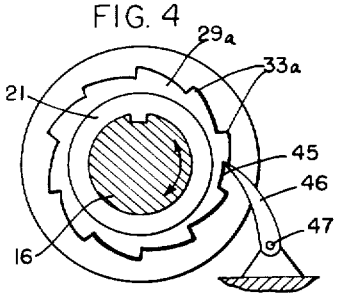
FIG. 4 is a transverse sectional view taken through a modified printing device according to the invention.

A modified stop or synchronizing arrangement is showr in FIG. 4, wherein the ratchet portion 29*a* is provided with a stop or recessed portion 45 for coaction with a stop pawl 46 that is normally arranged to engage the ratchet portion. The stop pawl 46 is pivotally mounted on a shaft 47. However, in this instance, the main shaft 16 will oscillate when resetting the printing wheels to their home position defined by the stop pawl 46.

Figure 1A:
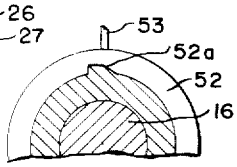
FIG. 1A is a fragmentary transverse sectional view taken substantially along line 1A—1A of FIG. 1.
Figure 3:
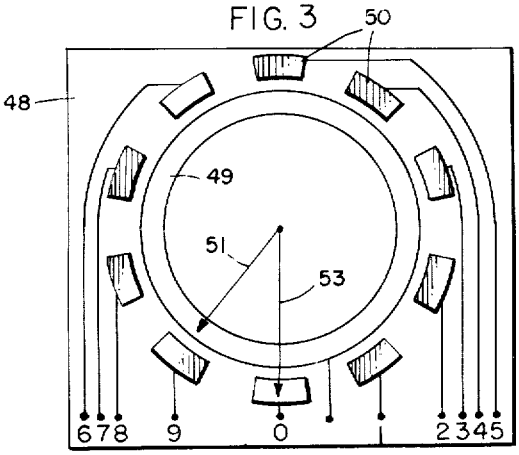
FIG. 3 is a schematic view of the contact plate employed with the printing device of FIG. 1.

Referring again to FIG. 1, a contact plate 48 made of insulating material is mounted on the frame 19 and provided with an one side thereof a continuous electrical conductor ring 49 and a plurality of conductor contacts 50 of a number equal to the number of symbols on the printing wheel. A wiper arm or contact arm 51 is mounted on an insulating ring 52 carried on the shaft 16 for engagement with the conductor ring 49. A second wiper arm or contact arm 53 is also carried by the insulating ring 52 and is adapted to engage the circumferentially spaced and concentrically arranged conductor contacts 50. The contact arms 51 and 53 are electrically connected, and as shown in FIG. 3, a conductor is connected to each of the conductor contacts 50 representing a numeral. The contact arm 53 is synchronized with the printing wheels before each setting of the wheels, and therefore also frictionally coupled to the shaft 16 and provided with an enlarged tooth 52*a*, FIG. 1A, for engagement by the stop pawl carried by the arm 42.

Figure 16:
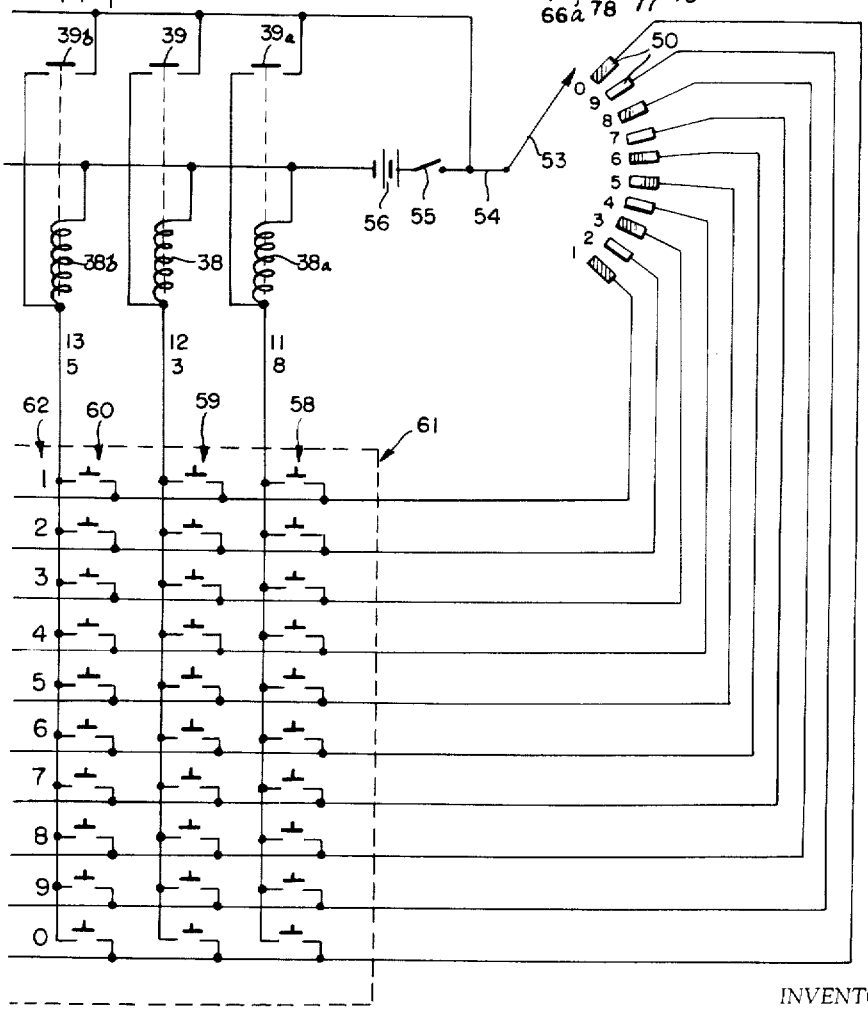
FIG. 16 is a schematic electrical diagram of circuitry for use with the printing wheel arrangement and illustrating the manner in which the printing wheels may be set in response to a pattern of signals.

Referring now particularly to FIG. 16, a schematical electric diagram shown therein illustrates the operation of the printing device in the setting of the printing wheels wherein a line 54 effectively connects the wiper arm 53 through the ring conductor 49 to an actuating switch 55. An electrical power source 56 is connected in series with the switch 55 and in turn with one side of electromagnets 38a and 38 which are associated respectively with the printing wheels 11 and 12. A third electromagnet 38b is shown which may be associated with the printing wheel 13 in the same capacity as electromagnets 38a and 38 are associated with printing wheels 11 and 12. Other electromagnets would also be provided which would be associated with the printing wheels 14 and 15, but are not shown herein for purposes of simplicity. The electromagnets 38a, 38 and 38b are in turn respectively connected to one side of each of a series of switch contacts 58, 59 and 60, respectively, in a control panel or relay outlet of a digital measuring instrument such as illustrated in general by the numeral 61. Each of the series of switch contacts 58, 59 and 60 are provided with ten switches, one for each of the numerals as illustrated in the column generally designated by the numeral 62. The switch contacts in each of the series of each digit are connected in series between the electromagnets and the conductor contacts 50 on the contact plate 48.

Holding circuits are provided for each of the electromagnets 38a 38 and 38b which respectively include switch contacts 39a, 39 and 39b that close upon energization of the respective electromagnets to override the wiper 53 and contacts 50 and hold the electromagnets in energized position after they have been momentarily energized by the wiper arm 53 passing over the appropriate conductor contacts 50. However, where the pawls on the ratchet are self-locking, the holding circuits and the associated switch contacts may be omitted since momentary energization of an electromagnet will cause a corresponding pawl to be swung against the ratchet portion and lock against a tooth.

In illustrating the operation of the printing device, where the numerals 8, 3, 5 are desired to be printed respectively on the printing wheels 11, 12 and 13, the respective switch contacts in the series 58, 59 and 60 will be closed. Thereafter, when the actuating switch 55 is closed, the stop pawl 41 is lifted out of engagement from the enlarged pawls on the ratchet portions such as the pawl 34 by action of the electromagnet 44 thereby releasing the printing wheels and the insulating ring 52 for rotation together by the frictional coupling with the shaft 16 that is continually rotating in one direction. When the wiper arm 53 engages the conductor contact 50 corresponding to the digit 8, the circuit for the electromagnet 38a is closed to swing the associated pawl 35a against the ratchet portion of the associated printing wheel 11 to thereby engage the tooth 33 corresponding to the digit 8 and stop the printing wheel so that the numeral 8 is in printing position, and at the same time to close the switch contact 39a in the associated holding circuit to maintain the electromagnet in energized position after contact between the wiper arm 53 and the conductor contact 50 corresponding to the digit 8. Thereafter, the contact arm 53 will pass over the conductor contact 50 which corresponds to the numeral 5 to thereby energize the electromagnet 38b to stop the printing wheel 13 and close the associated holding circuit controlled by switch contact 39b. Finally, the wiper arm will pass over the conductor contact corresponding to the numeral 3 to thereby energize the electromagnet 38 and stop the printing wheel 12. And again the holding circuit for the electromagnet 38 will be simultaneously energized by closing switch contact 39. With the holding circuits energized, the printing wheels will remain in their set position. All of the printing wheels continue to rotate by means of their friction drives until they are stopped. And after a full revolution has been established, all of the printing wheels are in their desired printing positions so that the hammer 27 can be actuated to print the set numbers against the paper tape 26. Thereafter the actuating switch 55 may be opened to release the printing wheels and resume the frictional coupling between the wheels and the shaft so that the wheels and insulating ring 52 with the wiper arm may be driven back to home position until the enlarged teeth abut against the stop pawl 41. The printing device is then ready for the next printing operation to be again initiated by selecting the digits by closure of switch contacts in the series 58, 59 and 60 and by energization of electromagnet 44 to release the wheels and insulating ring.

The embodiment of FIG. 4 operates in the same way including the printing operation, except that the shaft 16 revolves in the opposite direction after the printing operation has been completed to drive the printing wheels to their home positions as defined by the stop pawl 46 and the stop 45.

The preferred embodiment of the invention as to the construction of the printing wheels, their mounting on the drive shaft, and the pawl and ratchet mechanism is shown in FIGS. 5–14, wherein printing wheels 63 are frictionally coupled to a drive shaft 64 that is oscillatably driven through 120° revolutions by any suitable means. Each printing wheel includes a printing section 65 having a plurality of printing segments 66, a ratchet section 67 having a plurality of ratchet teeth 68, and a recessed section 69. Radial stops 70 and 71 on each printing wheel are defined by the recessed section 69 and are respectively at one end of the ratchet section and one end of the printing section, and coact with a stop bar 72 for operation of each printing wheel. Each of the sections 65, 67 and 69 span approximately one-third of the circumference of each printing wheel or an arcuate area of 120°.

The shaft 64 is provided with a plurality of axially spaced, circumferentially extending, annular wedge-shaped grooves 73 which coact with brake or friction shoes 74 received in radial slots or guides 75 in each of the printing wheels to frictionally couple the printing wheels to the shaft whereby each wheel will rotate with the shaft unless restrained by a force sufficient to overcome the friction coupling. The shoes also prevent the wheels from moving axially along the shaft. A pair of the brake shoes are provided for each printing wheel and are resiliently biased against the shaft and into the wedge-shaped groove 73 by means of a curvilinear spring 76 that is provided with a detent 77 at each end thereof engageable in a socket or recess 78 formed in the outer end of a brake shoe 74. Thus, each printing wheel is frictionally coupled to the shaft by means of the brake shoes 74 engaging in the wedge-shaped grooves 73. And the printing wheels will rotate or oscillate with the shaft unless they are held stationary relative thereto. A solenoid or electromagnet operated, self-locking, pawl 79 is provided to coact with the ratchet teeth 68 on the ratchet section 67 of a printing wheel. Each of the printing wheels is provided with a pawl which, as illustrated, is pivotal about a pin 80 and actuated into engagement with the teeth 68 by means of a solenoid 81 through linkage 82, FIG. 14. An electromagnet arrangement similar to that employed in the embodiment of FIGS. 1 and 2 may be used in place of the solenoid arrangement. Thus, when the shaft 64 is rotated in a clockwise direction during its oscillation, it will carry the printing wheels therewith unless the solenoid 81 for any respective printing wheel is energized to activate the pawl 79 into engagement with one of the ratchet teeth 68 after which the respective printing wheel will be held from further rotation with the shaft. All those printing wheels associated with solenoids that are not stopped by respective pawls will continue to rotate with the shaft 64.

Any number of printing wheels 63 may be mounted along the shaft in groups or in complete side-by-side relationship depending on the needs of a particular installation. The printing wheels, when placed in side-by-side relation such as in FIGS. 6 and 7 are arranged in somewhat nested relation. An annular notch 83 is formed on one side of each wheel only along the printing and ratchet sections that may freely receive a part of an adjacent wheel. An axial extending portion 48 opposite the notched side of the wheel includes an annular slot 85. Along the printing and ratchet sections, the slot is deepened by an extension lip 86 to receive the spring 76 and maintain its against lateral movement as may be seen in FIGS. 6 and 7.

The shoe receiving slots 75 which extend generally radially through the extending portion 84 coact with the extension lip 86 in maintaining the shoes against circumferential and axial movement. And the lip 86 is opened along the center portion of each shoe for facilitating insertion and removal of the shoes although it may be closed if so desired.

Each shoe is made of a bearing like material since it must be capable of having sliding contact with the shaft. Moreover, each shoe has an arcuate shaft engaging edge, which in cross section preferably includes a pair of beveled surfaces 88 and 89 extending between the sides of the shoe and a horizontal surface 90, whereby the beveled surfaces 88 and 89 engage the beveled surfaces of a shaft groove 73. And the horizontal surface 90 gives a blunt edge which will not engage the base of a groove 73.

Inasmuch as the pawls 79 associated with the ratchet teeth 68 are mechanically self-locking, it is only necessary to momentarily energize the solenoids 81 in order to lock the printing wheel in position. Accordingly, the holding circuits, as shown in the schematic diagram of FIG. 16 would not be used. Additionally, an insulating ring will also be oscillatable with the shaft 64 in synchronism with the printing wheels for operating the wiper arm 53 across the conductor contacts 50. But in this case, the insulating ring may be secured to the shaft at all times although it will be arranged so that the wiper arm need only pass through a 120° revolution in order to cover all of the contacts 50 in a manner shown in FIG. 16.

After the printing device of FIGS. 5–14 has completed a printing cycle, the shaft is then oscillated in the counter-clockwise direction, and the printing wheels are returned to the home position to reset the wheels for another printing cycle wherein the radial stops 70 of each wheel engage the stop bar 72.

In this embodiment, there may be provided eleven printing segments 66, one for each of the ten digits, and one for a symbol such as a star or asterisk, whereby upon the malfunctioning of any solenoid and pawl arrangement, the particular printing wheel involved will be driven to the position where the radial stop 71 engages the stop bar 72 and at that point the printing segment having the star or asterisk will be in printing position to indicate to the operator that the printing device is malfunctioning. This feature could also be incorporated in the embodiment of FIGS. 1 and 2 by adding another printing segment.

Figure 13:
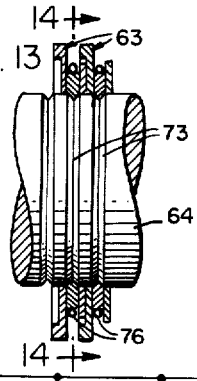
FIG. 13 is a fragmentary sectional view with some parts broken away and taken axially of the main shaft and showing a pair of printing wheels in association with each other.
Figure 14:
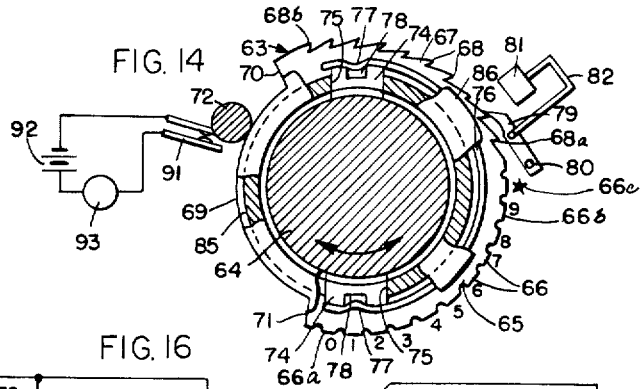
FIG. 14 is a transverse sectional view taken along line 14—14 of FIG. 13 and illustrating some parts schematically.

There are also ten teeth 68 on each wheel corresponding to the ten digits. For example if tooth 68a, FIG. 13, is engaged by the pawl 79, the numeral "0" on segment 66a would be in printing position, while engagement of the tooth 68b would place the numeral "9" on segment 66b in printing position. And if the solenoid failed to operate, the printing wheel stop 71 would engage the stop bar 72 and bring the asterisk "*" on segment 66c into printing position.

Additionally, the stop bar 72 may have associated therewith a sensing or detecting mechanism for detecting whether or not at least one of the printing wheels has completely rotated thereagainst to the position where the asterisk or other symbol would be printed and only in such case where a solenoid has malfunctioned. In this instance, a sensing switch 91 would be positioned to be closed by the stop 71 if it travels to the stop bar 72. Closing of the sensing switch 91 will energize a circuit having a power source 92 and an alarm or signal 93 therein to further indicate to the operator that the printing device is malfunctioning. The alarm or signal 93 may take the form of a buzzer, bell, light, or other suitable means.

Figure 15:
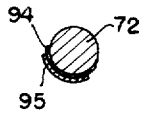
FIG. 15 is a sectional view taken through the printing wheel stop bar and illustrating a modified switch for use in detecting the malfunctioning of a printing wheel.

An alternate sensing switch is shown in FIG. 15 wherein an insulator 94 is secured to the stop bar 72 and has secured thereto an electrical contact 95. The contact 95 would be fixed and the radial stop 71 would function as a movable contact, both contacts functioning to replace the switch 91. Thus, one side of the alarm circuit would be electrically connected to the printing wheel and the other side to the contact 95.

This feature of having a signal to indicate malfunctioning could also be incorporated in the embodiment of FIG.

2 wherein a sensing switch would be associated with the stop pawl 41 but would be alive and operate only during the printing part of the cycle inasmuch as this stop is also used to synchronize the printing wheels when they are brought to their home position.

Although the printing wheels disclosed are provided with number characters, it should be appreciated that any number of alphabetical characters may be provided on a printing wheel with a like number of ratchet teeth so that any character may be brought into printing position. If all of the letters of the alphabet were arranged on a wheel, then a similar number of selection switches and wiper arm contacts would be provided. Moreover, means for selectively stopping the wheels other than a pawl and ratchet arrangement may be employed.

It will be understood that modifications and variations may be effected without departing from the scope of the novel concepts of the present invention, but it is understood that this application is to be limited only by the scope of the appended claims.

I claim:

1. A printing device for printing a series of selected characters during the printing phase along a line comprising, a rotatable shaft, means for continuously rotating said shaft in one direction, a plurality of printing wheels mounted on said shaft and frictionally coupled therefo to normally rotate therewith, first means for stopping said wheels to preset same at a home position and thereafter releasing same, each printing wheel having a character section and a ratchet section, a plurality of characters equally spaced along the character section, a plurality of ratchet teeth equally spaced along the ratchet section, and second means coacting with said ratchet section for stopping said wheels subsequent to their release by said first means including, a pawl aligned with each ratchet section and adapted to engage one of the teeth thereon and stop each printing wheel from rotating with the shaft, an electrically operated actuator for each pawl for driving same into and out of engagement with its respective ratchet section, settable control means defining selected character positions of each wheel, and switch means associated with each actuator and operated by said shaft in synchronism with said printing wheels for selectively energizing each actuator to move each pawl into engagement with a tooth on a ratchet section and stop each printing wheel at a preselected position as determined said settable control means for printing as series of preselected characters, said switch means including a single wiper arm frictionally coupled on said shaft and synchronized at home position with said wheels by said first means, and spaced contacts engageable with said wiper arm when operated by said shaft.

2. A printing device as defined by claim 1, and means coacting with said wheels for detecting the non-operation of each actuator during the printing phase.

3. A printing device as defined by claim 2, wherein said detection means includes a signal circuit energized by the non-operation of an actuator during the printing phase.

4. A printing device for printing a series of selected characters during the printing phase along a line comprising, a shaft, means for oscillating said shaft through a partial revolution, a plurality of printing wheels mounted on said shaft and frictionally coupled thereto to normally oscillate therewith, first means for stopping said wheels to preset same at a home position and thereafter releasing same, each printing wheel having a character section and a ratchet section, a plurality of characters equally spaced along the character section, a plurality of ratchet teeth equally spaced along the ratchet section, and second means coacting with said ratchet section for stopping said wheels subsequent to their release by said first means including, a pawl aligned with each ratchet section and adapted to engage one of the teeth thereon and stop each printing wheel from rotating with the shaft in one direction but permitting the wheels to rotate with the shaft in the other direction at all times, settable control means defining selected character positions of each wheel, an electrically operated actuator for each pawl for driving same into and out of engagement with its respective ratchet section, and switch means associated with each actuator and driven by said shaft in synchronism with said printing wheels for selectively energizing each actuator to move each pawl into engagement with a tooth on a ratchet section and stop each printing wheel at a preselected position as determined by said settable control means for printing a series of preselected characters, said switch means including a single contact plate having a plurality of spaced contacts adapted to be connected to said actuators and a single wiper arm connected to said shaft and engageable with said contacts, said wiper arm being synchronized at home position with said wheels by said first means.

5. A printing device as defined by claim 4, and means coating with said wheels for detecting the non-operation of each actuator during the printing phase.

6. A printing device for printing a selected character during the printing phase comprising, a rotatable shaft, a printing wheel mounted for rotation on said shaft, means for frictionally coupling said printing wheel to said shaft including a plurality of friction shoes guidably held by said wheel and spring means for urging said shoes in frictional engagement against said shaft, means for stopping said wheel to preset same at a home position and thereafter releasing same, said printing wheel having a character section and a ratchet section, a plurality of characters and a symbol equally spaced along the character section, said symbol being in print position when the wheel is preset by said stopping means at the home position, a plurality of teeth equally spaced along the ratchet section, one corresponding to each character, and means coacting with said ratchet section for stopping said wheel at a preselected position including, a pawl aligned with said ratchet section and adapted to engage one of the teeth thereon and stop said printing wheel from rotating with the shaft, an electrically operated actuator for said pawl to drive same into and out of engagement with the ratchet section, settable control means defining selected character positions of said wheel, and switch means associated with said actuator and driven by said shaft in synchronism with said printing wheel for selectively energizing said actuator to move said pawl into engagement with a tooth on the ratchet section and stop said printing wheel at a preselected position as determined by said settable control means for printing a preselected character, and said switch means including a single wiper arm driven by said shaft in synchronism with said wheel, spaced contacts engageable with said wiper arm when operated by said shaft, and means coacting with said wheel for detecting the non-functioning of said actuator by driving said printing wheel to home position so that the symbol is in print position during the printing phase.

7. A printing device for printing numerical values during the printing phase comprising, a shaft means for oscillating said shaft through a partial revolution, a plurality of printing wheels mounted on said shaft and frictionally coupled thereto to normally oscillate therewith, a stop bar adjacent said wheels and parallel to said shaft, means on said wheels coacting with said stop bar for stopping said wheels in a home position to preset same and in a second position, each printing wheel having a character section and a ratchet section, a plurality of characters and a symbol equally spaced along said character section, said symbol being in print position when each wheel is stopped by said stop bar in said second position, a plurlity of teeth equally spaced along the ratchet section of each wheel, one corresponding to each character, and means coacting with the ratchet section of each wheel for stopping said wheel at a preselected position including, a pawl aligned with each ratchet section and adapted to engage one of the teeth thereon and stop the corresponding printing wheel from rotating with the shaft, an electrically operated actuator for each pawl to drive same into and out of engagement with the ratchet section, settable control means defining selected character positions of each wheel, and switch means associated with said actuators and driven by said shaft in synchronism with said printing wheels for selectively energizing said actuators to move said pawls into engagement with a tooth on the ratchet section of each wheel and stop each printing wheel at a preselected position as determined by said settable control means for printing a preselected character, said switch means including a single wiper arm driven by said shaft in synchronism with said wheels, and spaced contacts engageable with said wiper arm when operated by said shaft, and means coacting with said wheels for detecting the non-functioning of an actuator by driving said printing wheel to said second position during the printing phase so that the symbol is in print position.

*8. A device for positioning a series of selected characters along a line comprising, a rotatable shaft, means for continuously rotating said shaft in one direction, a plurality of wheels mounted on said shaft and frictionally coupled thereto to normally rotate therewith, first means for stopping said wheels to preset same at a home position and thereafter releasing same, each wheel having a character section and a ratchet section, a plurality of characters equally spaced along the character section, a plurality of ratchet teeth equally spaced along the*

*ratchet section, and second means coacting with said ratchet section for stopping said wheels subsequent to their release by said first means including, a pawl aligned with each ratchet section and adapted to engage one of the teeth thereon and stop each wheel from rotating with the shaft, an electrically operated actuator for each pawl for driving same into and out of engagement with its respective ratchet section, settable control means defining selected character positions of each wheel, and switch means associated with each actuator and operated by said shaft in synchronism with said wheels for selectively energizing each actuator to move each pawl into engagement with a tooth on a ratchet section and stop each wheel at a preselected position as determined by said settable control means for positioning a series of preselected characters, said switch means including a single wiper arm frictionally coupled on said shaft and synchronized at home position with said wheels by said first means, and spaced contacts engageable with said wiper arm when operated by said shaft.*

References Cited by the Examiner

The following references, cited by the Examiner, are of record in the patented file of this patent or the original patent.

UNITED STATES PATENTS

| | | | |
|---|---|---|---|
| 2,133,865 | 10/1938 | La Boiteaux | 101—93 |
| 2,742,855 | 4/1956 | Hofgaard | 101—93 |
| 2,796,830 | 6/1957 | Hilton | 101—93 |

ROBERT E. PULFREY, *Primary Examiner.*

WILLIAM F. McCARTHY, *Assistant Examiner.*